INVENTOR.
COLIN D. HICKLING
BY Fraser and Bogucki
ATTORNEYS

Nov. 10, 1970 C. D. HICKLING 3,539,902

STATIC SPLIT-PHASE INVERTER HAVING SEQUENTIALLY CONDUCTING AMPLIFIER STAGES COUPLED TO ENERGIZE DIFFERENT SEGMENTS OF AN OUTPUT TRANSFORMER PRIMARY WINDING

Filed April 29, 1968 2 Sheets-Sheet 2

INVENTOR.
COLIN D. HICKLING

BY Fraser and Bogucki

ATTORNEYS

United States Patent Office 3,539,902

Patented Nov. 10, 1970

3,539,902

STATIC SPLIT-PHASE INVERTER HAVING SEQUENTIALLY CONDUCTING AMPLIFIER STAGES COUPLED TO ENERGIZE DIFFERENT SEGMENTS OF AN OUTPUT TRANSFORMER PRIMARY WINDING

Colin D. Hickling, Clarkson, Ontario, Canada, assignor to The Garrett Corporation, Los Angeles, Calif., a corporation of California Filed Apr. 29, 1968, Ser. No. 724,762
Int. Cl. H02m *1/12, 7/52*
U.S. Cl. 321—9 7 Claims

ABSTRACT OF THE DISCLOSURE

A static inverter circuit utilizing a plurality of amplifier stages to control the conversion of a constant DC voltage to an AC output developed from an output transformer. The output waveform is a reproduction of an input control signal applied to the amplifier stages to control their conduction. The primary winding of the output transformer has a plurality of separate sections and the individual amplifier stages control the current to the respective sections so as to in effect vary the turns ratio of the output transformer at different levels of the control signal.

BACKGROUND OF THE INVENTION

Various configurations of static inverter circuits have been developed to provide an output alternating waveform, typically a sine wave, from a DC power source. Some of the configurations which are known vary the time duration of the application of the DC power source to the output, depending upon a filter to change the pulses of DC to the desired alternating sine wave. Others utilize a sine wave control signal to vary the conduction of linear amplifier stages to develop a sine wave output from a DC power source. All of such configurations which are known however have certain inherent limitations, particularly with respect to the maximum theoretical efficiency of power conversion, which prevent them from being entirely satisfactory in the field of power conversion from DC to AC. Where Class B, push-pull power inverter circuits are employed, the limitation in theoretical maximum efficiency limits the application of such systems and requires particular high power amplifier components and power dissipation elements.

It is therefore a general object of the invention to provide an improved static inverter.

It is a more particular object of the present invention to provide an improved static inverter capable of operating with substantially increased efficiency over the maximum efficiency heretofore possible.

It is a further object of the present invention to provide a static inverter having reduced weight and size relative to previously known similar devices.

It is a still further object of the present invention to provide a static inverter which inherently operates with reduced electromagnetic interference with respect to previously known devices.

It is another object of the present invention to provide a static inverter capable of operating without the necessity for output filters.

SUMMARY OF THE INVENTION

In brief, the present invention contemplates the provision of a modified Class B, push-pull power stage utilizing a plurality of controllable conduction devices connected respectively to different sections of the primary winding of an output transformer with the conduction in the various devices being sequentially controlled under the influence of an input signal waveform so as to direct the current from a DC power source through different sections of the transformer primary winding for different portions of the input waveform. By varying the current in the transformer primary winding in this fashion, the turns ratio of the transformer is effectively varied for the different controllable conduction devices so that the individual device stages may be operated with improved efficiency and so that the overall circuit may operate with a higher overall efficiency than would be possible if the transformer were being driven by a single pair of push-pull amplifiers.

In one particular arrangement in accordance with the invention, each half of the push-pull power stage comprises three power transistors, each having its own driver transistor controlled from a common AC signal oscillator. The respective power transistor stages are biased at different bias levels so that each one is operative for a different portion of the input waveform. The respective power transistor stages control the current from a DC power source to the primary winding of an output transformer. The primary winding is divided into segments and the different power transistor stages are connected to these respective segments in an arrangement which bypasses one or more of the segments depending upon which of the power stages is conducting at the time. This effectively varies the turns ratio of the output transformer over a half period of the input waveform, providing for more effective control in the development of the output voltage over a wider range, relative to the input voltage, and developing increased efficiency by permitting each power conversion stage to operate over only a limited range of the input control signal waveform. By employing the techniques of the configuration just described, the AC output waveform is synthesized in steps in response to the input control signal sine wave, with each step being of high efficiency.

In accordance with one particular aspect of the invention, an improved output waveform is developed by utilizing the depletion mode of driving the respective power conversion stages. Operation of the arrangement in accordance with the invention by depletion mode control permits improved temperautre tracking for components in the driver circuits and also maintains a constant load reflected to the sine wave signal oscillator, thus permitting it to supply an undistorted voltage waveform.

In accordance with another aspect of the invention, the loading on the oscillator is further reduced by utilizing a pair of capacitors connected between the output of the power transistors and the input of the driver transistors to provide a boot strapping action.

A better understanding of the present invention may be had from a consideration of the following detailed description, taken in conjunction with the accompanying drawings, in which.

Figure 1:
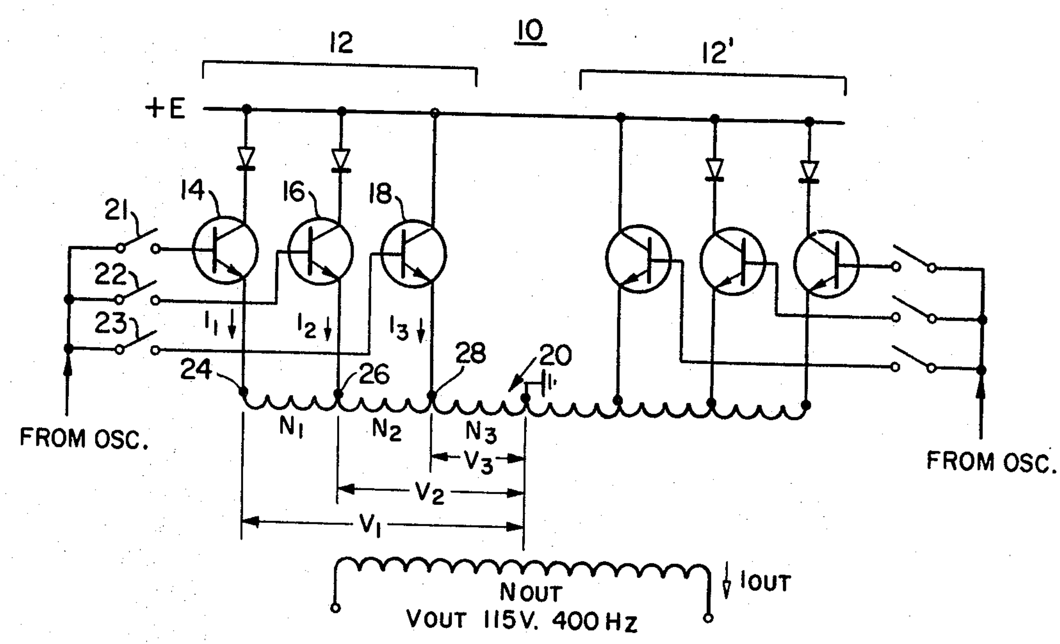
FIG. 1 is a simplified schematic diagram included for the purpose of illustrating particular principles of the present invention.

FIG. 1, which is a simplified schematic presented for purposes of illustration only, a push-pull inverter 10 is shown having two identical stages 12 and 12'. Only one of the two stages need be discussed for purposes of understanding. As shown in FIG. 1, the portion 12 is shown comprising three transistors 14, 16 and 18 connected between a positive DC potential +E and respective taps on a transformer winding 20. Each of the transistors 14, 16 and 18 is controlled respectively from an oscillator input signal by separate switches 21, 22 and 23.

Figure 2:
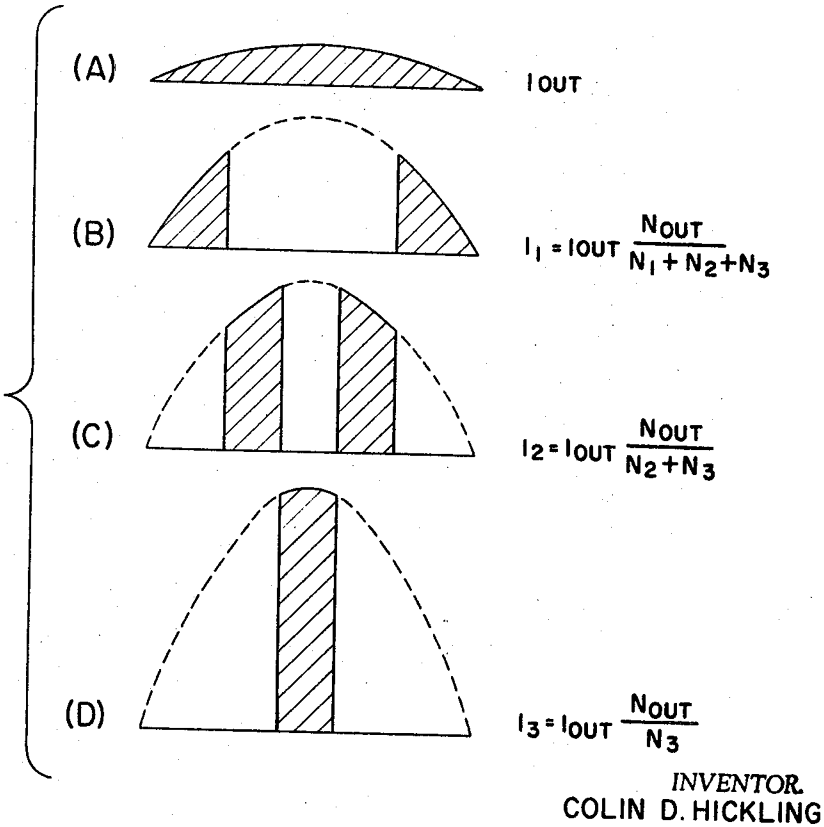
FIG. 2 is a diagram of respective waveforms corresponding to the operation of circuits in accordance with the invention.

Referring now to FIG. 2 for an explanation of the operation of the circuit of FIG. 1, to develop a given output current waveform such as is shown in FIG. 2(A) the control oscillator waveform begins at zero and rises positively. During this initial period represented by the left-hand shaded area in FIG. 2(B) the switch 21 may be considered closed so that the transistor 14 is controlled to provide increasing current to the transformer tap 24 which flows through all three segments $N_1$, $N_2$ and $N_3$ of the left-hand half of the winding 20. The effective turns ratio of the output transformer is the turns of the primary winding which are carrying current divided by the turns of the secondary winding. During this period of operation, therefore, the current $I_1$ through the transistor 14 is related to the output current by the inverse of the effective turns ratio as shown by the equation $$I_1=I_{out}\frac{N_{out}}{N_1+N_2+N_3} \qquad (1)$$

In the next interval of time, switch 21 may be considered to open and switch 22 is closed so that conduction is shifted from transistor 14 to transistor 16 under the control of the oscillator waveform. Current through the transistor 16 is delivered to the transformer winding tap 26 and flows through the two sections $N_2$ and $N_3$ of the winding 20. Since the effective turns ratio of the transformer is now different for the current flowing in the primary winding, the current $I_2$ through the transistor 16 bears the following relationship to the output current:

$$I_2=I_{out}\frac{N_{out}}{N_2+N_3} \qquad (2)$$

Thus the transistor 16 is operating in a higher current range than was the transistor 14 when it was conducting, corresponding to the left-hand shaded area of FIG. 2(C).

Finally conduction is shifted to the transistor 18 by the closing of the switch 23 and the opening of the switch 22 with the result that a current $I_3$ is directed to the transformer winding tap 28 to flow through the section $N_3$ of the winding 20. The current $I_3$ through the transistor 18 is related to the output current by the relationship:

$$I_3=I_{out}\frac{N_{out}}{N_3} \qquad (3)$$

Since the ratio $N_{out}/N_3$ is the largest secondary-to-primary ratio developed through the transformer during the operation of the circuit, the transistor 18 is driven at the highest level of current conduction, and conducts as shown in the shaded area of FIG. 2(D). Following conduction by the transistor 18, conduction is shifted in sequence to the transistors 16 and 14 as shown in the right-hand shaded areas of FIGS. 2(C) and 2(B) until the input waveform returns to zero. The operation is repeated thereafter for the right-hand portion 12' of the circuit 10 (with suitable wavefom inversion) for the negative half of the oscillator waveform. Thus the output waveform is developed by a stepped synthesis of current through a number of control stages, with each stage operating over a given range of input control signal level for which it is particularly biased.

Figure 3:
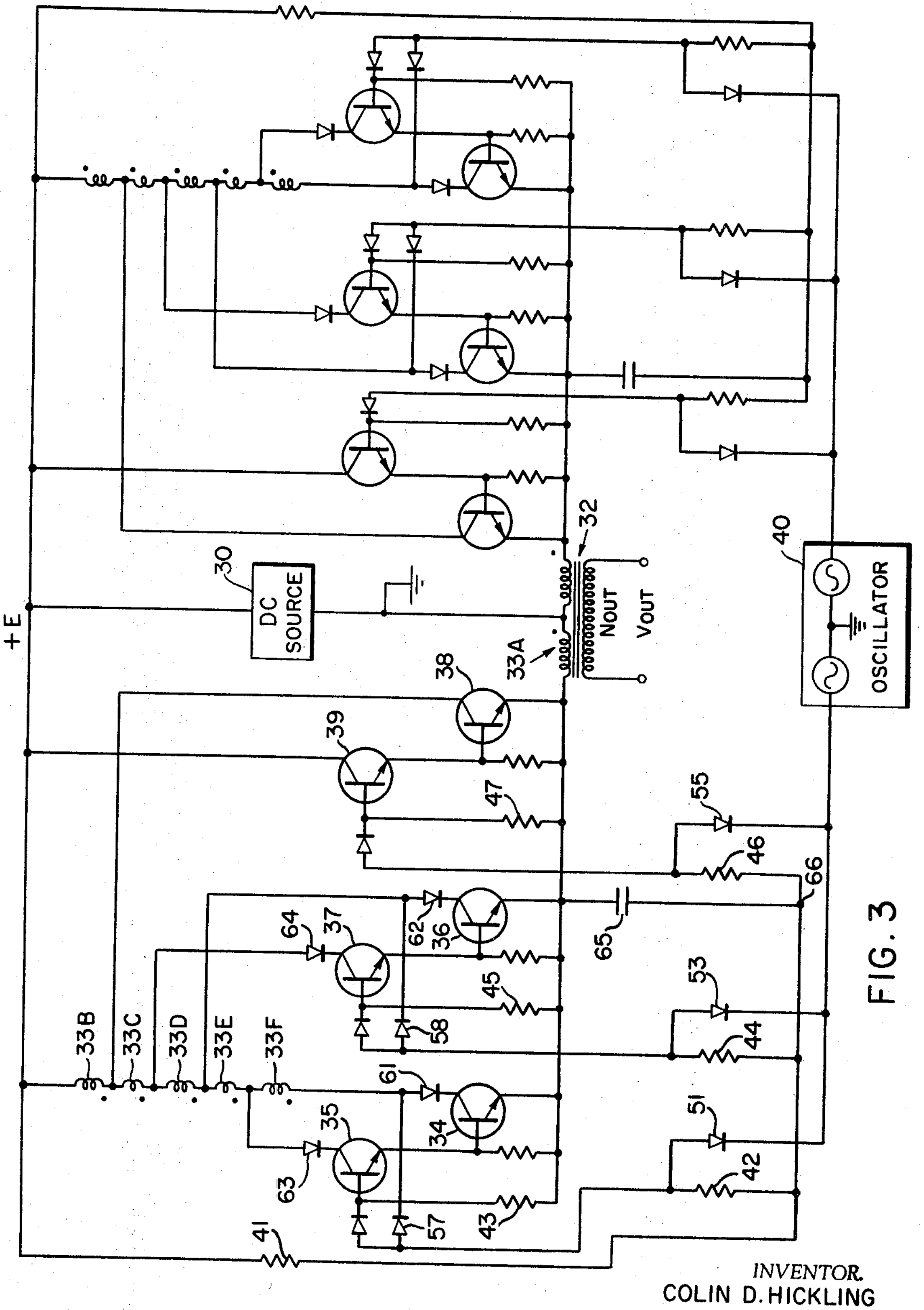
FIG. 3 is a schematic diagram illustrating one particular circuit in accordance with the invention.

A particular circuit embodiment of the present invention is shown in FIG. 3. In this circuit a DC source 30 is shown connected between the grounded center tap of the primary winding of a transformer 32 and the positive side of the circuit. The left-hand half of the input winding of the transformer 32 is shown comprising the segments 33A, 33B, 33C, 33D, 33E and 33F. Each of the dots adjacent one end of each of the winding segments indicates like polarity for current in the same direction, in accordance with convention. Power transistors 34, 36 and 38 are connected as shown to different taps on the primary winding of the transformer 32 so as to control the conduction through particular portions of the winding across the DC source 30. Thus, when the transistor 34 conducts, current flows through all of the segments 33A–33F of the left-hand half of the primary winding of the transformer 32. With transistor 34 cut off and the transistor 36 conducting, currents flows through the segments 33A–33D of the pirmary winding of the transformer 32. With transistor 38 conducting and transistors 34 and 36 cut off, current flows through sections 33A and 33B only of the left half of the input winding of the transformer 32. Thus it will be seen that the discussion with respect to FIGS. 1 and 2 is applicable to the circuit shown in FIG. 3.

The circuit of FIG. 3 includes an input control signal oscillator 40 which is the source of the waveforms used to control the conduction in the power transistor such as 34, 36 and 38. With each power transistor 34, 36 and 38, there is associated a corresponding driver transistor 35, 37 or 39. Biasing current for the driver transistors 35, 37 and 39 is supplied from the DC source 30 via a common resistor 41 and individual resistors 42, 44 and 46. Coupling from the control signal oscillator 40 to each of the driver transistors 35, 37 and 39 is provided via a diode 51, 53 or 55 connected respectively to the upper ends of the resistors 42, 44 and 46. Arrangement of the circuit in this fashion permits control of the driver transistors from the oscillator 40 by use of the depletion mode of operation. That is, base currents to the driver transistors 35, 37 and 39 are supplied from the positive terminal of the DC source 30 through the common bias resistor 41 and the individual bias resistors 42, 44 and 46, but not from the oscillator 40 directly, although the driver transistor base current is controlled by the amplitude of the oscillator voltage applied to the diodes 51, 53 and 55. It should be understood that the peak voltage of the oscillator 40 is always less than the voltage of the DC source 30.

Because of different values for the resistors 42, 44 and 46 and the other driver transistor biasing resistors 43, 45 and 47, transistors 35, 37 and 39 are provided with different biasing currents. Therefore, as a positive going signal from the oscillator 40 is applied to the bases of the transistors 35, 37 and 39, the driver transistor 35 begins to conduct first and consequently drives the associated power transistor 34 into conduction. Current from the DC source 30 starts to flow through all of the windings 33A–33F of the left-hand half of the primary winding of the output transformer 32. The voltage across these windings continues to increase as the conductivity of the power transistor 34 follows the waveform of the oscillator 40. The voltage across these primary winding sections corresponds to $V_1$ of FIG. 1. When the voltage $V_1$ approaches +E the potential of the DC source 30, the transistor 34 begins to saturate, thus limiting the voltage $V_1$. At this moment $V_2$, the voltage across the winding segments 33A–33D equals $$V_1\frac{(N_2+N_3)}{N_1+N_2+N_3}$$

which is lower than $V_1$ or the +E potential. Now, continuously increasing the voltage at the base of the driver transistor 37 forces the transistors 37 and 36 to conduct. Because of transformer action, the voltage at the lower end of the winding segment 33F is now decreasing and this potential clamps the drive potential at the base of the transistor 35 via the diode 57, thus forcing the transistors 35 and 34 to cut off.

When the voltage $V_2$ across the winding segments 33A–33D approaches +E, transistors 37 and 36 saturate and, by action similar to that just described, transistors 39 and 38 begin to conduct, thus keeping transistors 34, 36 cut off by clamping the respective bases of the driver transistors 35 and 37 via the diodes 57 and 58. As the waveform of the oscillator 40 decreases in amplitude following the next section of the sine wave, conduction shifts back successively from the transistor 38 to the transistor 36, thence to the transistor 34 and finally to zero in the reverse of the action described for the increasing portion of the oscillator 40 waveform. Each of the three power transistors 34, 36 and 38 operates during a part of the oscillator 40 half cycle, contributing to the synthesized output waveform. During the other half of the cycle of the oscillator 40, a similar procedure is repeated using the identical circuit on the right-hand half of the diagram.

It will be noted that each driver transistor 35, 37 or 39 is connected to a higher voltage tap of the transformer 32 input winding than is its associated power transistor 34, 36, or 38 in order to compensate for the voltage drop across the series diode 61 or 62 and the associated power transistor. This particular arrangement allows for wider input voltage range operation and improved efficiency. Series diodes 61, 62, 63 and 64 are used to protect the transistors to which they are connected from excessive reverse voltages which might be developed by the shift of current conduction to the next higher stages.

The capacitor 65 is connected as shown between the emitter terminals of the power transistors 34, 36 and 38 and the common bias node 66 of the biasing circuit for the driver transistors 35, 37 and 39 in order to perform a boot strapping action which maintains the base voltage of the driver transistors 35, 37 and 39 close to the varying emitter voltage of the power transistors 34, 36 and 38. This boot strapping action provided by the connection of the capacitor 65 serves to reduce the loading on the oscillator 40.

Static inverter circuits in accordance with the present invention as embodied in the diagram of FIG. 3, for example, provide significant advantages over conventional inverter circuits because of their inherently improved efficiency which is the result of dividing the current conduction for a given portion of the input waveform among a number of amplifier stages, each of which is biased to operate in a selected range. This will be more apparent from the following discussion.

For the ordinary Class B push-pull stage, the theoretical efficiency may be expressed as $$\text{EFF.}=\frac{P_o}{P_{in}}=\frac{\frac{V_m I_m}{2}}{\frac{2E_{DC}I_m}{\pi}}=\frac{\pi V_m}{4E_{DC}} \qquad (4)$$

where $E_{DC}$=input voltage
$V_m$=peak value of the sinusoidal output voltage

From this expression, it may be seen that the maximum efficiency is obtained when $V_m$ equals $E_{DC}$. In this case the efficiency equals $\pi/4$ or 78.5%. If the input voltage is varied while the output has to be maintained constant—as is the typical case where an inverter is used to provide a steady AC voltage at 115 volts—the efficiency is drastically reduced. For example, if $E_{DC}$ is increased from 18 volts in one instance to 30 volts in another, the efficiency which may be obtained drops to 47%.

$$\text{EFF.}=\frac{\pi V_m}{4E_{DC}}=\frac{\pi\times 18}{4\times 30}=47\% \qquad (5)$$

The technique provided by the present invention improves the efficiency under such conditions considerably. A generalized expression for the total transistor power dissipation for an N-step power stage of the type described hereinabove is as follows:

$$P_D=\frac{2EI_1}{\pi}[1+\cos\gamma_1\cos\phi(K_2-1)+\cos\gamma_2\cos\phi(K_3-K_2)+\cos\gamma_x\cos\phi(K_{x+1}-K_x)+\ldots+\cos\gamma_{N-1}\cos\phi(K_{N-1}-K_{N-2})]-\frac{V_1I_1\cos\phi}{2} \qquad (6)$$

Where:

E=input voltage (DC)
$I_1$=peak current in transistor 34
$V_1$=peak voltage across one half of the transformer primary.

$$K_2=\frac{I_2}{I_1}\quad K_3=\frac{I_3}{I_1}$$

etc.

$$\gamma_1=\sin^{-1}\left(\frac{E}{V_1}\right)\quad \gamma_N=\sin^{-1}\left(\frac{E}{V_N}\right)$$

etc.
Cos $\phi$=load power factor.

The expression for the output power is:

$$P_0=\frac{V_0I_0}{2}=\frac{V_1I_1}{2} \qquad (7)$$

Therefore, the efficiency for the "Split-$\phi$" stage is:

$$\text{EFF.}=\frac{P_0}{P_0+P_d} \qquad (8)$$

By selecting appropriate transformer turn ratios for the inverter circuit of FIG. 3, which selection will depend upon various factors for the particular application including the input voltage, the maximum current, the power factor, the design overload, etc., it can be shown that for a three-step configuration as in the circuit of FIG. 3, theoretical efficiency close to 80% can be obtained, as compared to the 47% maximum theoretical efficiency calculated for the ordinary Class B circuit for the same input and output voltage conditions. By using a larger number of steps for the inverter circuit, even higher efficiencies can be realized. However, the improvement in efficiency drops off with each step which is added.

Another advantage realized by circuits in accordance with the present invention results from the substantial elimination of spurious RF energy. In conventional switching-type power stage, a serious problem results from the generation of spurious RF. The split-phase inverter power stage of the present invention is relatively free of this problem owing to the linear operation mode of the power transistors and the relatively low rate of change of the currents employed. Suppression of the spurious RF energy is part of the power stage design and no electromagnetic interference (EMI) filters are required on either input or output of the inverter.

Another advantage of the linear mode of operation of the power stage described herein is the low harmonic distortion of the output voltage waveform. Although a stepped current waveform is produced on the primary side of the output transformer, the secondary current and voltage waveforms retain the same quality sine wave as the oscillator drive signal, provided that proper biasing is used to prevent crossover distortion. Elimination of the EMI and harmonic filters contributes greatly to the reduction in weight, size and cost of the inverters of the present invention. At the same time, a reduction in complexity and improvement in reliability is obtained.

Although there have been described hereinabove specific arrangements of a static split-phase inverter system in accordance with the invention for the purpose of illustrating the manner in which the invention may be used to advantage, it will be appreciated that the invention is not limited thereto and that various changes in form and detail may be made therein without departing from the spirit and scope of the invention.

What is claimed is:

1. Inverter apparatus for developing AC output power from a DC power source under the control of an AC input signal, comprising:

an output transformer having primary and secondary windings, the primary winding being split for push-pull operation with each half having a plurality of taps thereon;

a plurality of controllably conductive power transistors connected to respective ones of said taps for controlling the flow of current from the DC source through particular segments of said primary winding;

biasing means for establishing different bias levels for the different power transistors, the biasing means cooperating with the input alternating waveform to transfer conduction from one to another of the power transistors in step-wise fashion for different amplitude levels of the input waveform over the extent of said waveform and including a plurality of driver transistors, each connected to a corresponding power transistor and arranged to receive the input signal in order to control the corresponding power transistor in response to a selected portion of the input signal waveform; and capacitive storage means connected between the common output of the power transistors and the common input to the driver transistors for limiting the potential difference between those two points.

2. Inverter apparatus for developing AC output power from a DC power source under the control of an AC input signal, comprising:

an output transformer having primary and secondary windings, the primary winding being split for push-pull operation with each half having a plurality of taps thereon;

a plurality of controllably conductive power transistors connected to respective ones of said taps for controlling the flow of current from the DC source through particular segments of said primary winding;

biasing means for establishing different bias levels for the different power transistors, the biasing means cooperating with the input alternating waveform to transfer conduction from one to another of the power transistors in step-wise fashion for different amplitude levels of the input waveform over the extent of said waveform and including a plurality of driver transistors, each connected to a corresponding power transistor input and arranged to receive the input signal in order to control the corresponding power transistor in response to a selected portion of the input signal waveform; and clamping means connected between a primary winding tap and a driver transistor for transmitting a cutoff potential to the particular drive transistor associated with the power transistor previously conducting when conduction is initiated in the next succeeding power transistor.

3. Inverter apparatus in accordance with claim 2, wherein the clamping means comprises a diode.

4. Inverter apparatus for developing AC output power from a DC power source under the control of an AC input signal, comprising:

an output transformer having primary and secondary windings, the primary winding being split for push-pull operation with each half having a plurality of taps thereon;

a plurality of controllably conductive power transistors connected to respective ones of said taps for controlling the flow of current from the DC source through particular segments of said primary winding;

biasing means for establishing different bias levels for the different controllably conductive devices, the biasing means cooperating with the input alternating waveform to transfer conduction from one to another of the power transistors in step-wise fashion for different amplitude levels of the input waveform over the extent of said waveform and including a plurality of driver transistors, each connected to a corresponding power transistor input and arranged to receive the input signal in order to control the corresponding power transistor in response to a selected portion of the input signal waveform; and means connecting each driver transistor between the input electrode of its associated power transistor and a point which is closer to the potential of the DC source when said associated power transistor is conducting than is the output connection of said associated power transistor.

5. Inverter apparatus in accordance with claim 4 further including a diode coupled between at least one of the driver transistors and the point which is closer to the potential of the DC source, and a diode coupled in the output connection of the associated power transistor.

6. Inverter apparatus for developing alternating output power from a DC power source in response to an applied alternating waveform comprising:

an output transformer having primary and secondary windings, the primary winding being split electrically into sections and having a plurality of taps thereon;

a plurality of controllably conductive devices interconnected with the separate sections of the primary winding and the taps thereon to control the flow of current in selected portions of the primary winding;

means for varying the effective turns ratio of the transformer by selectively establishing conduction in one or another of said devices in accordance with the instantaneous amplitude of the input waveform;

a biasing circuit for said controllaby conductive devices deriving biasing current from the DC source; and means for causing said biasing current to vary in accordance with the applied alternating waveform.

7. Inverter apparatus in accordance with claim 6, wherein the biasing circuit and the means for causing said biasing current to vary together comprise a separate resistor coupled between the DC source and each of the controllably conductive devices, and a separate diode coupled between each of the resistors and the associated controllably conductive device for drawing biasing current from the path between the resistor and associated controllably conductive device in accordance with the value of the applied alternating waveform.

References Cited

UNITED STATES PATENTS

| | | | |
|---|---|---|---|
| 2,239,437 | 4/1941 | Bedford. | |
| 2,959,726 | 11/1960 | Jensen. | |
| 3,196,337 | 7/1965 | Elliott et al. | |
| 3,241,038 | 3/1966 | Amato | 321—9 X |
| 3,430,073 | 2/1969 | Leonard. | |

FOREIGN PATENTS

| | | |
|---|---|---|
| 841,476 | 6/1962 | France. |

J D MILLER, Primary Examiner

W. H. BEHA, Jr., Assistant Examiner

U.S. Cl. X.R.

321—43; 323—43.5